US007844902B2

(12) United States Patent
Cappels, Sr. et al.

(10) Patent No.: US 7,844,902 B2
(45) Date of Patent: Nov. 30, 2010

(54) APPARATUS AND METHOD FOR HANDLING SPECIAL WINDOWS IN A DISPLAY

(75) Inventors: Richard D. Cappels, Sr., San Jose, CA (US); Christoph Horst Krah, Los Altos, CA (US); Johanna M. Andrews, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 79 days.

(21) Appl. No.: 12/190,502

(22) Filed: Aug. 12, 2008

(65) Prior Publication Data

US 2009/0037819 A1 Feb. 5, 2009

Related U.S. Application Data

(62) Division of application No. 09/160,503, filed on Sep. 24, 1998, now Pat. No. 7,412,654.

(51) Int. Cl.
*G06F 3/00* (2006.01)

(52) U.S. Cl. ....................... 715/719; 715/720; 715/721; 715/722; 715/726; 382/100; 382/232

(58) Field of Classification Search ................. 715/719, 715/720, 721, 722, 726; 382/100, 232
See application file for complete search history.

(56) References Cited

U.S. PATENT DOCUMENTS

| | | | |
|---|---|---|---|
| 4,709,267 A | 11/1987 | Sendelweck | |
| 4,733,229 A | 3/1988 | Whitehead | |
| 4,858,112 A | 8/1989 | Puerzer et al. | |
| 4,876,663 A | 10/1989 | McCord | |
| 4,907,174 A * | 3/1990 | Priem | 345/422 |
| RE33,973 E | 6/1992 | Kriz et al. | |

(Continued)

FOREIGN PATENT DOCUMENTS

EP 0 856 829 9/1998

(Continued)

OTHER PUBLICATIONS

U.S Appl. No. 08/900,964, filed Jul. 25, 1997 by Richard D. Cappels, Sr.

(Continued)

*Primary Examiner*—Weilun Lo
*Assistant Examiner*—Mylinh Tran
(74) *Attorney, Agent, or Firm*—Morrison & Foerster LLP

(57) ABSTRACT

An apparatus and method for handling special windows in a display comprises a window manager in an operating system that is called by application programs to create special windows. The window manager embeds static key signals including encoded special window information, such as the coordinates of a window area to be specially processed, into a video RAM. An existing video interface scans the video RAM and transmits display information, including the key signals, to the display. The present invention further comprises a window decoder in the display, that detects the key signals, extracts the encoded special window information, and controls display circuitry performing the desired special processing. The key signal encoding scheme does not create visually discernible display aberrations that could distract the user or interfere with normal window management.

24 Claims, 9 Drawing Sheets

U.S. PATENT DOCUMENTS 5,150,107 A 9/1992 Kurisu
5,204,748 A 4/1993 Lagoni
5,313,291 A 5/1994 Appel et al.
5,386,247 A 1/1995 Shafer et al.
5,394,067 A 2/1995 Santelmann, Jr.
5,396,151 A 3/1995 Cappels, Sr.
5,469,540 A 11/1995 Powers, III et al.
5,473,371 A 12/1995 Choi
5,493,317 A 2/1996 Kim
5,497,436 A 3/1996 Miller
5,512,961 A 4/1996 Cappels, Sr.
5,550,433 A 8/1996 Tobler
5,550,556 A 8/1996 Wu et al.
5,555,026 A 9/1996 Lee
5,561,459 A 10/1996 Stokes et al.
5,570,108 A * 10/1996 McLaughlin et al. ........ 715/823
5,574,507 A 11/1996 Baek
5,579,029 A 11/1996 Arai et al.
5,588,098 A 12/1996 Chen et al.
5,606,348 A 2/1997 Chiu
5,638,117 A 6/1997 Engeldrum et al.
5,675,391 A 10/1997 Yamaguchi et al.
5,694,227 A 12/1997 Starkweather
5,706,035 A 1/1998 Tsunoda et al.
5,724,519 A 3/1998 Kato et al.
5,726,672 A 3/1998 Hernandez et al.
5,731,843 A 3/1998 Cappels, Sr.
5,742,354 A 4/1998 Viahos et al.
5,745,097 A 4/1998 Cappels
5,786,803 A 7/1998 Hernandez et al.
5,821,917 A 10/1998 Cappels
5,841,420 A * 11/1998 Kaply et al. ................ 345/421
5,889,500 A 3/1999 Chuang et al.
5,903,267 A 5/1999 Fisher
5,917,488 A 6/1999 Anderson et al.
5,926,174 A 7/1999 Shibamiya et al.
5,959,691 A 9/1999 Koh
5,966,124 A 10/1999 Devine
5,977,946 A 11/1999 Mizobata
5,978,041 A * 11/1999 Masuda et al. .............. 348/563
5,978,745 A 11/1999 Devine
5,990,858 A 11/1999 Ozolins
6,026,409 A 2/2000 Blumenthal
6,052,676 A * 4/2000 Hekmatpour ................ 706/11
6,075,531 A 6/2000 DeStefano
6,169,533 B1 1/2001 Tse
6,170,273 B1 1/2001 Bosi
6,333,739 B1 12/2001 Koyama et al.
6,407,775 B1 6/2002 Frink et al.

FOREIGN PATENT DOCUMENTS

WO WO-96/17338 6/1996
WO WO-98/32277 7/1998
WO WO-00/17842 3/2000

OTHER PUBLICATIONS

U.S Appl. No. 09/009,042, filed Jan. 20, 1998 by Richard Cappels.
U.S Appl. No. 09/076,664, filed May 12, 1998 by Christoph H. Krah.
U.S Appl. No. 09/705,140, filed Nov. 1, 2000 by Richard D. Cappels, Sr.

* cited by examiner

| SYMBOL | MEANING | DATA LENGTH |
|---|---|---|
| START | START SEQUENCE INDICATED BY BLUE=RED | 6 BITS |
| CODE | UNIQUE DATA PATTERN TO DISTINGUISH KEY SIGNALS FROM OTHER DATA | 16 BITS |
| HOFF | HORIZONTAL OFFSET WITH SIGN BIT INDICATING LEFT/RIGHT OFFSET | 9 BITS |
| VOFF | VERTICAL OFFSET | 8 BITS |
| CRC | CRC CHECKSUM FOR HOFF AND VOFF | 8 BITS |
| STOP | STOP SEQUENCE INDICATED BY BLUE=RED | 6 BITS |

APPARATUS AND METHOD FOR HANDLING SPECIAL WINDOWS IN A DISPLAY

CROSS-REFERENCE TO RELATED APPLICATION

This application is a divisional of U.S. Ser. No. 09/160,503, filed Sep. 24, 1998 now U.S. Pat. No. 7,412,654, which is related to co-pending U.S. patent application Ser. No. 08/900,964, entitled "System And Method For Generating High-Luminance Windows On A Computer Display Device", filed on Jul. 25, 1997. The contents of these documents are incorporated herein by reference. These related applications are commonly assigned.

BACKGROUND OF THE INVENTION

1. Field of the Invention

This invention relates generally to display devices, and relates more particularly to an apparatus and method for handling special windows in a display.

2. Description of the Background Art

Effective presentation of visual information is an important consideration for manufacturers, designers, and users of displays. Such displays are commonly used for interfacing with computers. Many modern computer operating systems use graphical user interfaces that enclose information from application programs in separate viewing areas or windows in a display to simplify information management.

These special windows in a display may be used for presentation of different types of information than are typically shown in the remainder of the display. In some applications, use of a special window in a display may be desirable to help distinguish or differently process information. For example, a computer system may present video information from a video source (such as a video camera or video tape recorder) in a special window, while simultaneously presenting more traditional computer-generated information such as text and graphics in the rest of the display.

Conventional computer displays are designed to present text and graphics, but are not specifically designed to present video information. Luminance levels in conventional computer displays are usually considerably lower than the luminance levels used in conventional video monitors or television screens. Video information presented in conventional computer displays thus appears to have less contrast between bright and dark areas, and tends to look rather murky. Raising luminance levels is one possible way to enhance the presentation of video information in computer displays, but problems may arise from indiscriminately raising luminance levels over the entire display surface.

For example, text or graphics outside the special window may become blurred, decreasing the overall effectiveness of the display. Furthermore, continuously raising luminance levels over the entire display surface may unacceptably accelerate the aging of the display tube. These problems could be avoided with an effective means for identifying and locating the limited portions of a special display window to be advantageously processed.

The coordinates of a special display window may be transmitted to a display via a separate data channel. For example, the serial interface available on most modern computers may be dedicated to this purpose. However, this potential solution presents a number of difficulties. First, such a system would demand significant additional hardware within a computer system; a second serial interface card would have to be managed by the computer system. Second, the signals generated by such serial interface hardware would have to be precisely calibrated with the horizontal and vertical video synchronization signals going to the display. Finally, significant software development would be required to coordinate such a dual-channel interface system.

Therefore, for the foregoing reasons, an improved apparatus and method for handling special windows in a display is needed, in accordance with the present invention.

SUMMARY OF THE INVENTION

In accordance with the present invention, an apparatus and method are disclosed to handle special windows in a display.

In one embodiment of the present invention, windows comprise frames that are created by an operating system, and content areas that are created by an application program. The windows are special if they include content areas or portions of content areas that are to be specially processed, such as being displayed with higher than normal luminance. Software developers preferably trigger special window creation by calling a window manager, which includes operating system functions specifically designed to simplify special window use.

In accordance with the present invention, special windows include key signals that enable display circuitry to identify windows to be specially processed. The key signals also include information needed by display circuitry to locate the boundaries of the portion of the content area to be specially processed. The key signals are preferably static patterns in a special window, so that no separate signals or second communication channel beyond the existing video interface are required to trigger special processing. The operating system places digital representations of all display information, including special windows, into a video RAM in the preferred embodiment. The existing video interface circuitry scans the video RAM and produces video signals to be sent to the display. A window decoder in the display detects the key signals, extracts the embedded special window information from the key signals and controls the display circuitry performing the special processing desired.

Key signals are patterns of colored pixel (picture element) pairs. A color coding scheme enables storage of key signal information in a manner that is easily detectable by the window decoder, yet is not visually discernible, given the limited acuity of the human eye. In additive color display systems, primary colors (red, green, blue) can be mixed to produce secondary colors (yellow, cyan, magenta). If a pixel of a primary color is placed next to a pixel of an opposite secondary color (that is, one not including the primary color) of equal luminance, the resulting pixel pair resembles a single pixel that is an achromatic gray in color. This enables the key signal to be plainly displayed in a gray window frame without causing visual distraction. One primary color channel serves as the data signal, and another is used as a complement to produce the achromatic gray color of pixel pairs.

The key signal color coding scheme preferably uses the remaining primary color channel in the existing video interface as a video clock signal. A separate clock in the window decoder is synchronized to the video clock signal when a key signal is present. The separate but synchronous internal clock is continuously available to the window decoder, and enables the use of a precise but relative (versus absolute) display coordinate system. The location of any pixel in the display can be determined and controlled by the time elapsed since the last horizontal and vertical synchronization pulses in the existing video interface. No second communications channel for transmission of external timing pulses for precise pixel location is required. The window decoder can use key signal information and existing synchronization pulses to control the timing, and thus location, of special processing for desired portions of the display with respect to the upper left corner of the display.

Key signal information includes start and stop sequences, code sequences to distinguish a key signal from other display data, horizontal and vertical offset values, and a CRC checksum. The horizontal and vertical position of the key signal and the horizontal and vertical offset values can be summed by the window decoder to yield the coordinates of the portion of the content area to be specially processed. The window decoder uses the other sequences in a variety of means for verifying the presence of a window intended to be specially processed. Accidental special processing could be very distracting to the user and should be avoided. For example, key signals preferably identifying upper left and lower right corners of the portion of the content area to be specially processed should be detected in one scan, and should persist for a set number of scans. Similarly, code sequences should match a pair of preset sequences, and three bits of unchanging color, as in a gray frame, should be present prior to the start sequence of each key signal. Many other conditions used to avoid accidental special processing are described in the detailed description of the present invention. Once the window decoder enables special processing, the window decoder disables special processing only when no special windows exist, or when the special window is occluded by another window.

The present invention therefore handles special windows in a display, enabling more effective presentation of visual information.

DETAILED DESCRIPTION OF THE PREFERRED EMBODIMENT

The present invention relates to an improvement in displays, including computer displays. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention comprises an apparatus and method for handling special windows in a display. The invention uses a modified display window frame created by a window manager from an operating system, and transmitted to the display over a video interface. This window frame includes key signals with unique characteristics that are visually unobtrusive, and yet are easily detected and processed by display circuitry to identify and locate special windows for advantageous processing, in accordance with the present invention.

Figure 1:
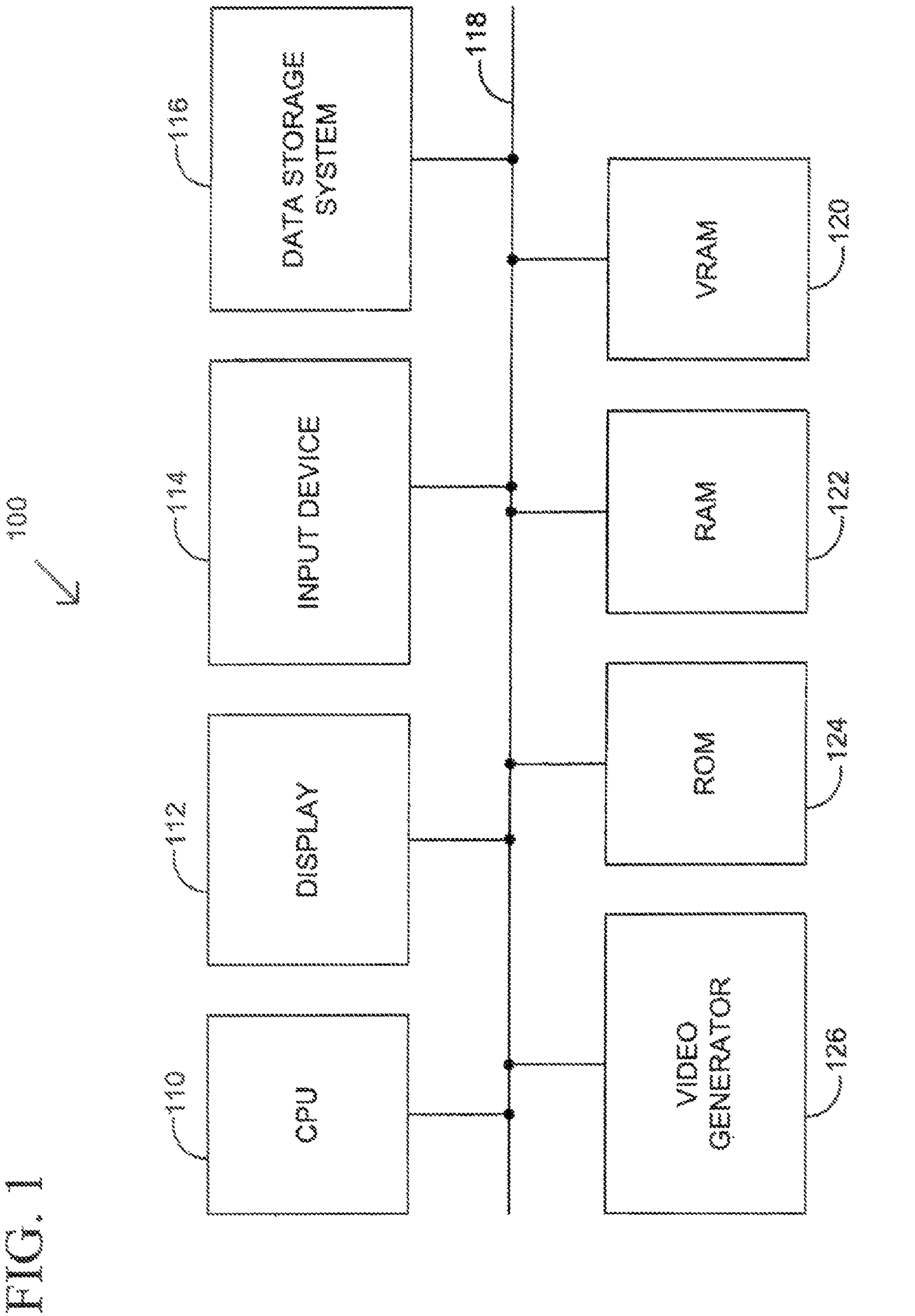
FIG. 1 is a block diagram for one embodiment of a computer system, in accordance with the present invention.

Referring now to FIG. 1, a block diagram for one embodiment of a computer system is shown, in accordance with the present invention. Computer system 100 preferably comprises a central processing unit (CPU) 110, a display 112, an input device 114, a data storage system 116, a video random access memory (VRAM) 120, a random access memory (RAM) 122, a read-only memory (ROM) 124, and a video generator 126. Each element of computer system 100 is preferably coupled to a common data bus 118. Input device 114 may alternatively comprise various configurations, including elements such as a keyboard or a mouse. Data storage system 116 may also alternatively comprise various configurations, including elements such as a floppy disk or a hard disk. Computer system 100 of the present invention may include, but is not limited to, an Apple Macintosh computer system.

Figure 2:
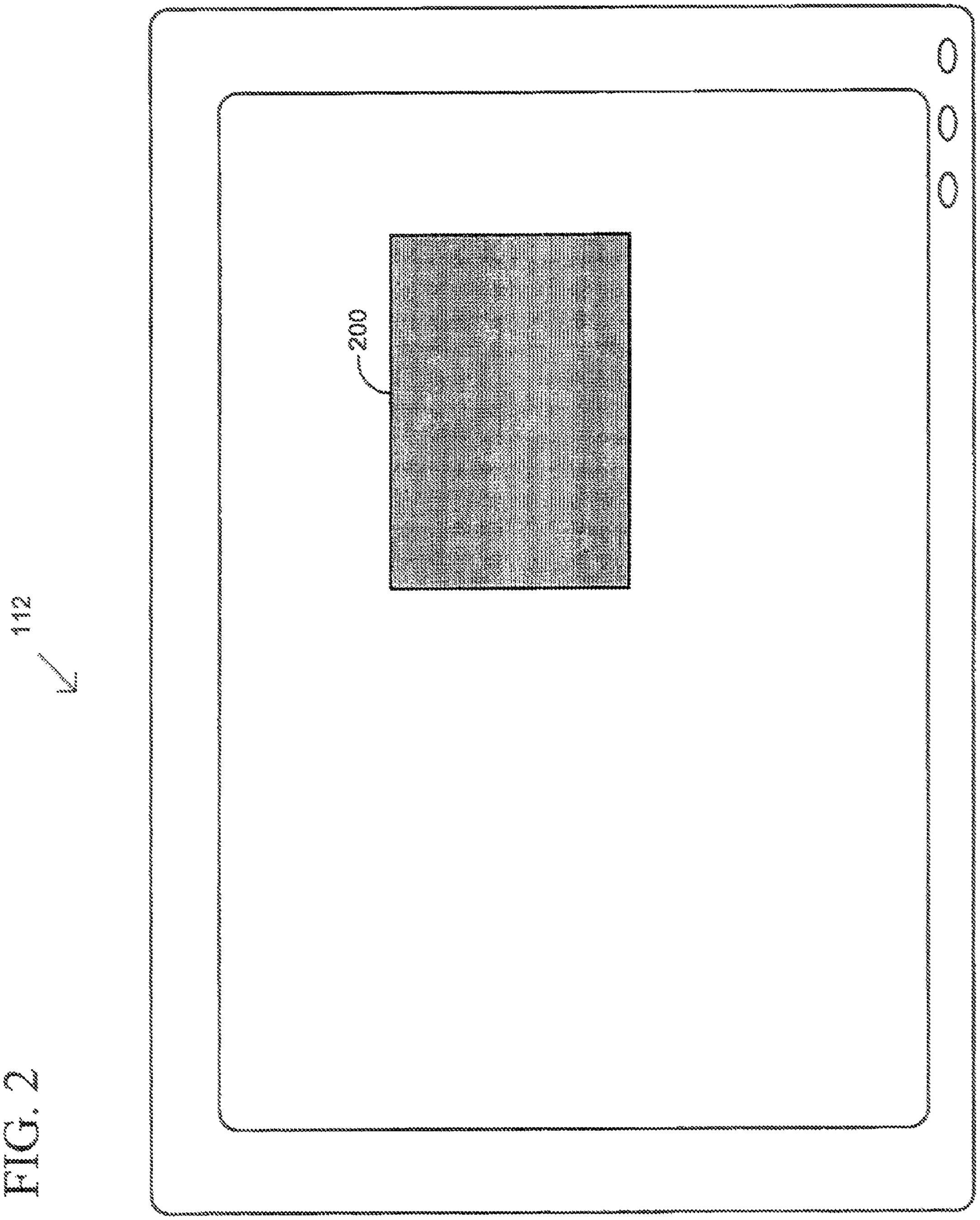
FIG. 2 is a diagram for one embodiment of the display of FIG. 1, including a window, in accordance with the present invention.

Referring now to FIG. 2, a diagram for one embodiment of display 112 of FIG. 1, including a window 200, is shown, in accordance with the present invention. Display 112 of the preferred embodiment may include, but is not limited to, a cathode-ray-tube based video monitor. However, other types of commonly used displays including liquid-crystal-based displays may alternatively be encompassed by the present invention. Information is preferably updated on display 112 in a rastered manner, i.e., display 112 is periodically scanned horizontally from left to right and then vertically from top to bottom with sufficient speed that the eye will not perceive the scanning process. Display contents are thus depicted as picture elements or pixels. Each pixel corresponds to a specific time with respect to the start of a scan. Window 200 contains information related to a specific task being performed by computer system 100. The size and location of window 200 in display 112 may be modified by the user as needed, usually via input device 114. A particular window 200 in display 112 is activated when first displayed or selected by the user as the active window 200.

Figure 3:
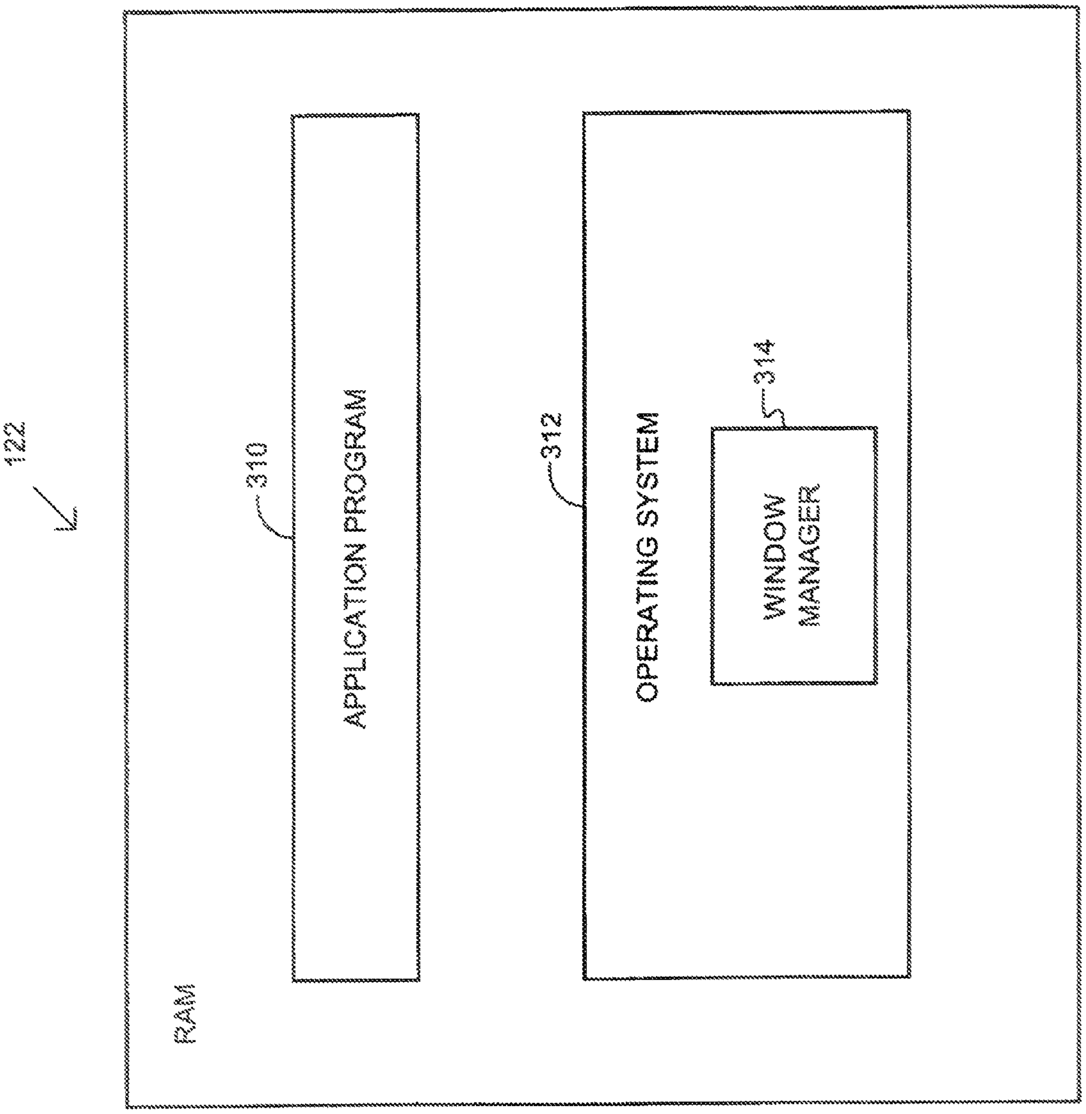
FIG. 3 is a block diagram for one embodiment of the RAM of FIG. 1, in accordance with the present invention.

Referring now to FIG. 3, a block diagram for one embodiment of RAM 122 of FIG. 1 is shown, in accordance with the present invention. In the FIG. 3 embodiment, RAM 122 includes an application program 310 and an operating system 312. Application program 310, often created by an independent software developer, enables computer system 100 to perform a specific task, such as word processing, communication via the Internet, processing of numerical data in a spreadsheet, or playback of a multimedia file. A modern computer system 100 can simultaneously run multiple application programs 310. Operating system 312 performs a multitude of tasks to simplify use of computer system 100. These tasks usually include installation and coordination of the various hardware components of computer system 100, creation and management of files, and operations relating to a graphical user interface in display 112. Window manager 314 is a subset of operating system 312 that simplifies creation and management of windows 200. Creators of application programs 310 need only include calls to window manager 314 to inform operating system 312 that a particular size and type window 200 is required. Window manager 314 is specifically intended to minimize the software development burden faced by creators of application programs 310.

Figure 4:
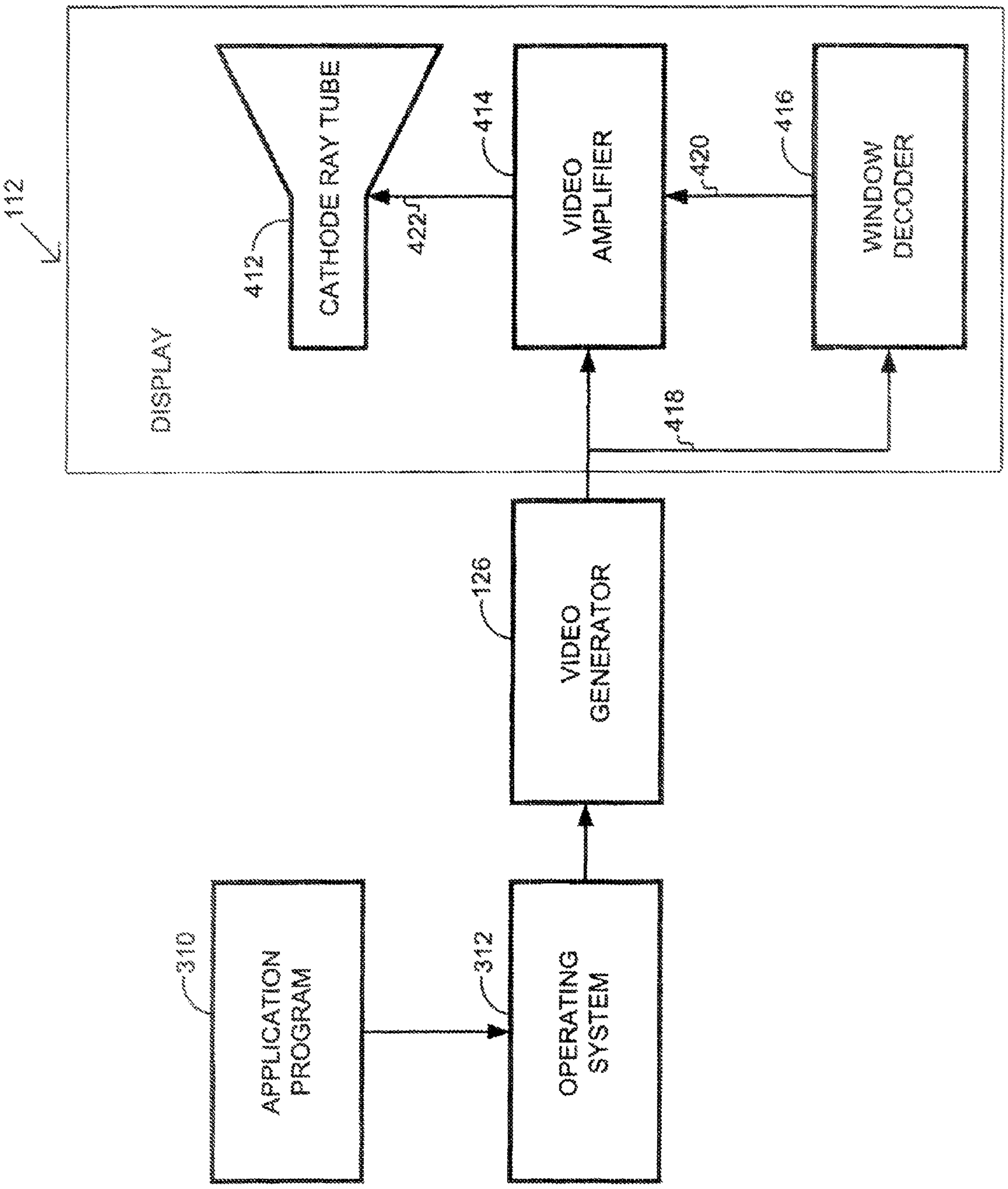
FIG. 4 is a block diagram showing one embodiment for the processing of display data, in accordance with the present invention.

Referring now to FIG. 4, a block diagram showing one embodiment for the processing of display data is shown, in accordance with the present invention. In the FIG. 4 embodiment, application program 310 and operating system 312 share responsibility for managing windows 200. Application program 310 instructs operating system 312 to create window 200 and thereafter supplies window content information to operating system 312. In one embodiment, video RAM 120 (FIG. 1) contains the information to be placed onto display 112, including text, graphics, and window information from operating system 312 as well as window content information from application program 310. Video generator 126 repeatedly scans through video RAM 120 (FIG. 1) and produces appropriate video signals to be passed to display 112 to enable visual depiction of the contents of video RAM 120.

In the FIG. 4 embodiment, display 112 comprises a cathode ray tube 412, a video amplifier 414, and a window decoder 416. Video signals 418 from video generator 126 are passed to video amplifier 414 and to window decoder 416. Window decoder 416 selectively generates a control signal 420 to indicate to video amplifier 414 that a given picture element or pixel in display 112 is to be processed differently than other pixels. Video amplifier 414 includes circuitry to responsively implement the desired special attribute, such as increased luminance, by responsively generating output signals 422 for cathode ray tube 412 based on video signals 418 from video generator 126 and the presence or absence of control signal 420 from window decoder 416. In the event that window decoder 416 does not produce control signal 420 denoting the existence of a pixel to be specially processed, video amplifier 414 produces output signals 422 for cathode ray tube 412 that result in a regular depiction of video information. In the event that window decoder 416 does produce control signal 420 denoting the existence of a pixel to be specially processed, video amplifier 414 produces different output signals 422 for cathode ray tube 412 that will result in that pixel being specially displayed. For example, a pixel might be displayed with a relatively higher luminance level whenever window decoder 416 generates control signal 420. Synchronization of special pixel processing with the rastering process in display 112 results in the correct target areas of a special window 200 being specially processed.

Figure 5:
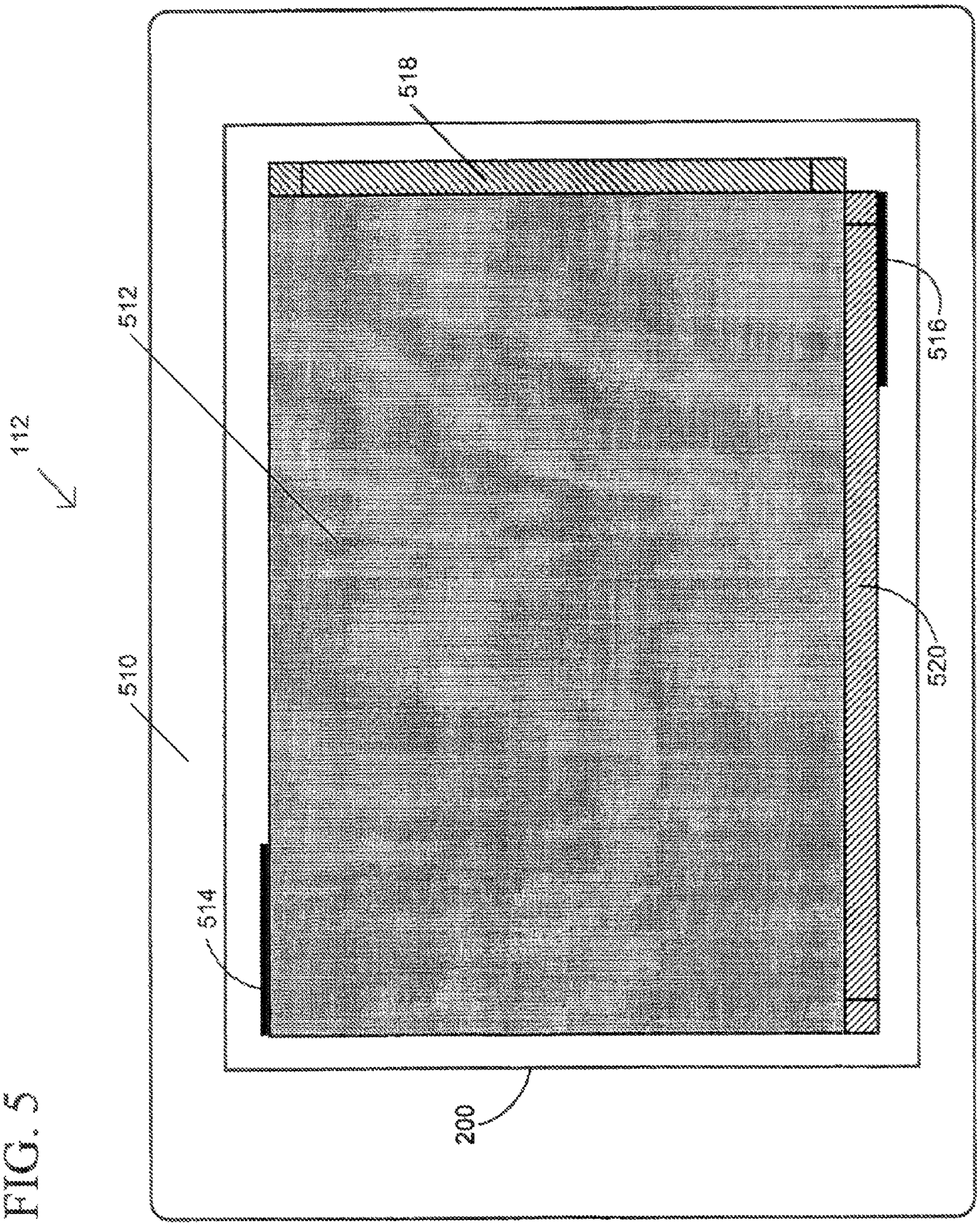
FIG. 5 is a diagram for one embodiment of a window in the FIG. 1 display, in accordance with the present invention.

Referring now to FIG. 5, a diagram for one embodiment of a window 200 in the FIG. 1 display 112 is shown, in accordance with the present invention. The window 200 in display 112 includes a frame 510, a content area 512, a first key signal 514, a second key signal 516, a vertical scroll bar 518, and a horizontal scroll bar 520.

Operating system 312 creates and manages frame 510, while application program 310 provides information to be displayed in content area 512 to operating system 312. Frame 510 contains depictions of first key signal 514—and second key signal 516, which each contain information regarding the dimensions of the portion of content area 512 in display 112 to be specially processed. Frame 510 also includes window control tools, such as vertical scroll bar 518, and horizontal scroll bar 520. In an alternate embodiment, scroll bars 518 and 520 may help control special processing. For example, the position of a slide in horizontal scroll bar 520 might denote the relative degree to which luminance levels are to be raised. The first key signal 514 preferably identifies and locates the upper left corner of the portion of content area 512 to be specially processed. The second key signal 516 preferably identifies and locates the lower right corner of the portion of content area 512 to be specially processed.

Alternate key signal embodiments may include other information, such as a field to denote the selection of different types of special processing that display 112 can perform. Window manager 314 of operating system 312 preferably creates both first key signal 514 and second key signal 516. Key signals should not interfere with normal window 200 operation, and should not distract the user. Display 112 depicts the information contained in first key signal 514 and second key signal 516 in a visually unobtrusive manner to be further described in connection with FIG. 6 below. Alternate embodiments of the present invention may handle multiple windows 200 to be specially processed. Similarly, windows 200 to be specially processed are not necessarily required to be rectangular in shape. A minimum size for windows 200 is determined by the size of key signals; in other words, key signals should not protrude beyond the frame 510 of windows 200.

In the preferred embodiment, video RAM 120 stores a digital representation of all pixels to be depicted on display 112. Window manager 314 in operating system 312 encodes and stores both first key signal 514 and second key signal 516 in video RAM 120, in the preferred embodiment. Application programs 310 define data to be displayed in content area 512 and supply such data to operating system 312. The operating system 312 defines all other data to be displayed. Video generator 126 then, in the preferred embodiment, scans video RAM 120, and produces video signals 418 transmitting the entire contents of video RAM 120 to display 112. First key signal 514 and second key signal 516 are thus passed to display 112 along with all other contents of video RAM 120, in the preferred embodiment.

A second communications channel, such as a separate serial interface, is therefore not required. However, since the entire contents of video RAM 120 will be depicted on display 112, the information in first key signal 514 and in second key signal 516 should be encoded in a manner that will not be visually distinctive to the viewer when both key signals are depicted on display 112. Furthermore, key signals transmitted to conventional video monitors, i.e. those not equipped to perform special processing, should not cause malfunctions or display aberrations.

Figure 6:
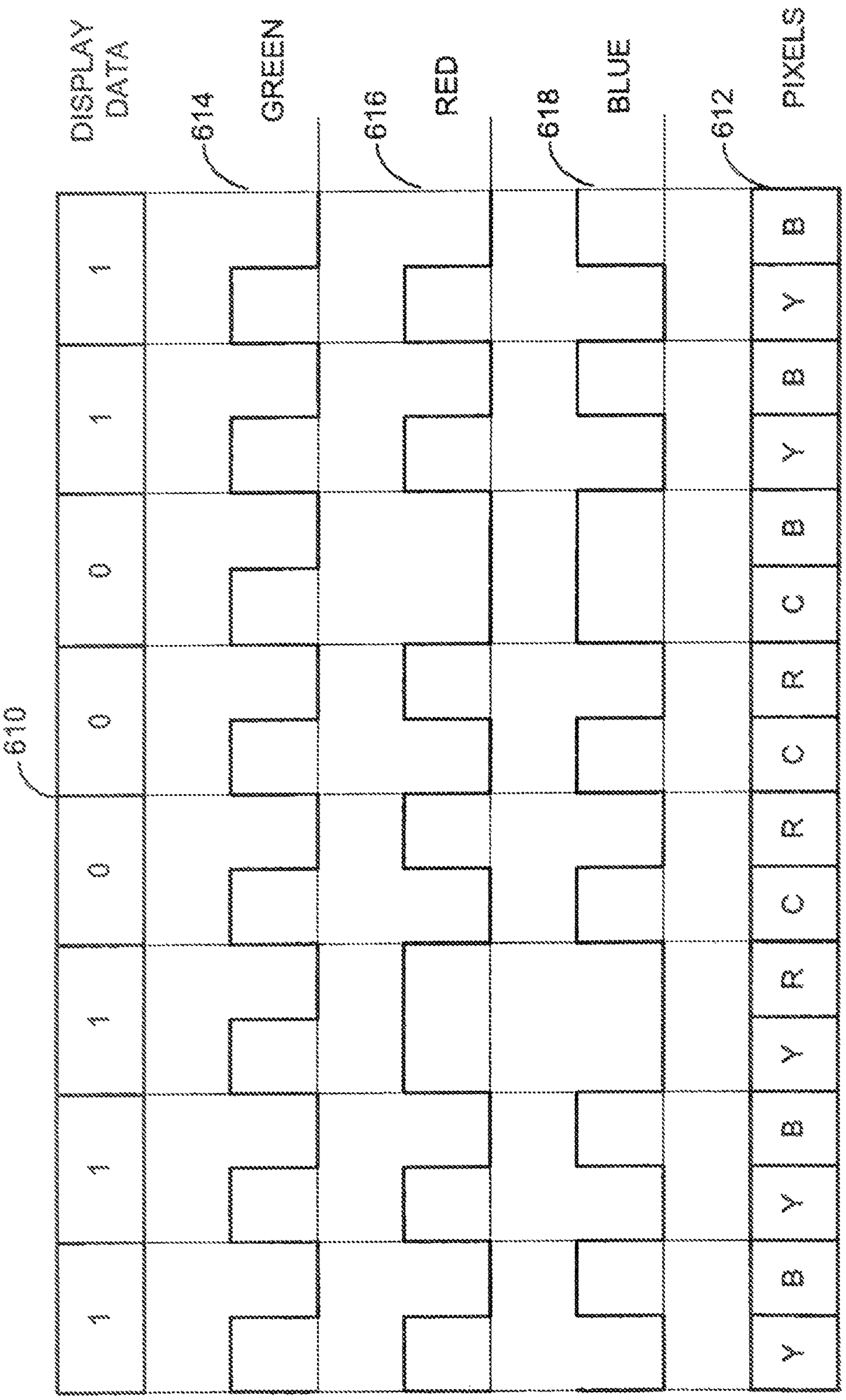
FIG. 6 is a timing diagram for one embodiment of display data encoded into exemplary pixels, in accordance with the present invention.

Referring now to FIG. 6, a timing diagram for one embodiment of display data 610 encoded into exemplary pixels 612 is shown, in accordance with the present invention. Display data 610 represents an arbitrary sequence of bits to be encoded into pixels 612 in a manner that will produce an unobtrusive achromatic gray when depicted on display 112. Display data 610 is presented for purposes of illustration, and other embodiments may readily contain different sequences of binary data. Each bit of display data 610 is represented by two pixels 612. Each pixel 612 has green, red, and blue content of various values. A return-to-zero encoding scheme is used so that a pair of up/down transitions occurs in one or two pixels 612.

Green content is shown in a green waveform 614, red content is shown in a red waveform 616, and blue content is shown in a blue waveform 618. In the FIG. 6 embodiment, window manager 314 uses green waveform 614 as a clock to clearly define the duration of individual pixels 612, which is analogous to individual pixel 612 width in a rastered display 112. Use of pixel 612 color data, represented in the preferred embodiment by green waveform 614, as a clock renders use of a second clock communicated via a second communication channel (such as a serial interface card) unnecessary. In the preferred embodiment, a rising edge of green waveform 614 clocks in—preceding data. Red waveform 616 carries display data 610. A transition from a high to a low display data 610 value or vice-versa causes red waveform 616 to alter its phase with respect to green waveform 614 as shown. The blue waveform 618 is the logical inverse of red waveform 616.

The mixture of the green, red, and blue content as given in green waveform 614, red waveform 616, and blue waveform 618, respectively, determines the overall perceived color of each resulting pixel 612. In all figures, these letters denote the following colors: R=red, G=green, B=blue, C=cyan, M=magenta, Y=yellow. In additive color systems, cyan results from an equal mixture of green and blue, magenta results from an equal mixture of red and blue, and yellow results from an equal mixture of red and green. Mixing a secondary color with an opposing primary color (one not contained in the secondary color) of equal luminance generally results in a mixture that appears gray to the viewer. When a pixel 612 of a primary color (red, green, or blue) is located next to a pixel 612 of a corresponding secondary color (cyan, magenta, or yellow, respectively) of proper brightness, the resulting pair of pixels 612 approximates a single achromatic gray pixel 612 in appearance, given the limited spatial acuity of the human eye. Display 112 thus depicts display data 610 without notable visual aberration when display data 610 is encoded into pixels 612 colored in this manner. In the preferred embodiment, a binary logic value of "1" is denoted by a yellow pixel 612 neighboring a blue pixel 612, and a binary logic value of "0" is denoted by a cyan pixel 612 neighboring a red pixel 612. The first key signal 514 and the second key signal 516 of the FIG. 6 embodiment are patterns of data display 610 bits that have been accordingly color-coded into pixels 612, forming embedded instructions to trigger special window processing. Modifications to this particular embodiment using configurations other than those described above are intended to be covered by the present invention. For example, in some display systems it may be preferable to use red waveform 616 as a clock signal and blue waveform 618 as the data signal.

Figures 7A, 7B:
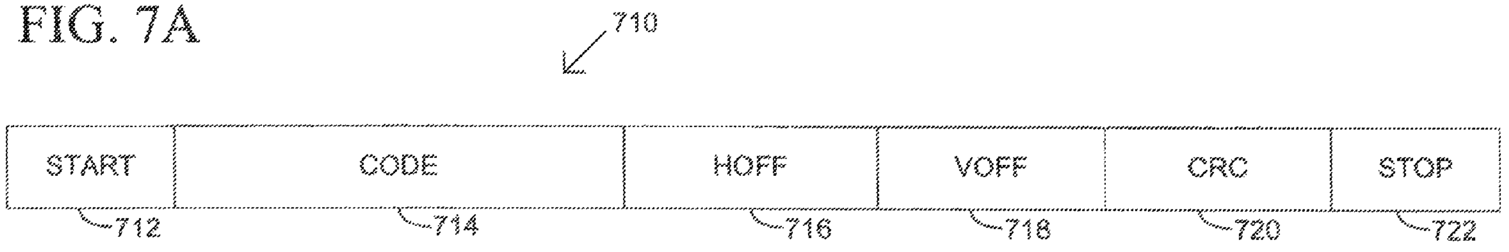
FIG. 7A is a block diagram for the preferred embodiment of the FIG. 5 key signals, in accordance with the present invention.
FIG. 7B is a table describing one embodiment for components of the FIG. 7B key signals.

Referring now to FIG. 7A, a block diagram for the preferred embodiment of a key signal format 710 for FIG. 5 key signals 514 and 516 is shown, in accordance with the present invention. Referring also to FIG. 7B, a table describing one embodiment for components 712 through 722 of the FIG. 7A key signal format 710 is shown. First key signal 514 and second key signal 516 each include fields of display data 610 bits as shown in key signal format 710. The data fields or key signal components include a start sequence (START) 712, a code sequence (CODE) 714, a horizontal offset (HOFF) 716, a vertical offset (VOFF) 718, a CRC checksum (CRC) 720, and a stop sequence (STOP) 722, as shown in FIG. 7A and described in FIG. 7B. These foregoing key signal components enable window decoder 416 to detect key signals 514 and 516, and to extract special window information reliably. Definition of special window coordinates relative to the beginning of vertical or horizontal scans of display 112 is more efficient than definition of absolute special window coordinates from a clock signal transmitted via an additional communications channel. Alternate embodiments may include other key signal components. Similarly, alternate embodiments may use more complex key signals, such as a hidden watermark or a highly visible copyright or trademark logo.

Start sequence 712 of the preferred embodiment is a 6-bit pattern in which the data on blue waveform 618 is equal to the data on red waveform 616, i.e., logical inversion is not performed. This distinguishes start sequence 712 from code sequence 714, horizontal offset 716, vertical offset 718, and CRC checksum 720, enabling window decoder 416 to reliably discern the presence of start sequence 712. Start sequence 712 clears registers and resets counters in window decoder 416, as will be detailed below.

Code sequence 714 of the preferred embodiment is a unique 16-bit pattern used to distinguish the presence of first key signal 514 or second key signal 516 from other display data 610. Use of a unique pattern for code sequence 714 substantially reduces the likelihood that other display data 610 will accidentally be misconstrued as either first key signal 514 or second key signal 516 and trigger unintended special window processing. Different code sequences 714 are used for first key signal 514 and second key signal 516, with one preferably the logical inverse of the other. In the preferred embodiment, code sequence 714 for first key signal 514 is 0001101111100100, and code sequence 714 for second key signal 516 is 1110010000011011. Both key signals should be found by window decoder 416 during a single scan of display 112 in order to determine the presence of a window 200 to be specially processed. Use of a static pattern for first key signal 514 or for second key signal 516 enables a static image of a special window alone to trigger special window processing whenever the static image is displayed. No separate signals are required to activate special window processing because the key signals are contained within the static image.

Horizontal offset 716 of the preferred embodiment is a 9-bit pattern denoting the horizontal distance in pixels 612 from the beginning of a reference point to the horizontal edge of content area 512 that is to be differently processed. One bit of horizontal offset 716, preferably the ninth, is used as a sign bit indicating an offset to the left of the reference point if set, and an offset to the right of the reference point if not set. For first key signal 514, the reference point is the end of start sequence 712 of first key signal 514, so that the left border of the portion of content area 512 to be specially processed is located at the end of start sequence 712 plus or minus horizontal offset 716. For second key signal 516, the reference point is the beginning of stop sequence 722 of second key signal 516, so that the right border of the portion of content area 512 to be specially processed is located at the beginning of stop sequence 722 plus or minus horizontal offset 716. Summation of horizontal key signal reference positions and horizontal key signal offsets thus determines the horizontal coordinates of the portion of content area 512 to be specially processed.

Vertical offset 718 of the preferred embodiment is an 8-bit pattern denoting the vertical distance in pixels 612 from the beginning of a reference point to the vertical edge of the content area 512 to be differently processed. For first key signal 514, the reference point is the vertical line on which first key signal 514 begins, and the offset is counted downward. For second key signal 516, the reference point is the vertical line on which second key signal 516 begins, and the offset is counted upward. Summation of vertical key signal reference positions and vertical key signal offsets thus determines the vertical coordinates of the portion of content area 512 to be specially processed.

Horizontal offsets 716 and vertical offsets 718 are necessary. Application programs 310 control the display data 610 to be depicted inside content area 512, while operating system 312 controls frame 510 and the key signals located in frame 510. In the preferred embodiment, both horizontal offsets 716 and vertical offsets 718 are set to default values that select entire content area 512 but not frame 510 elements such as scroll bars for special processing. Different offset values select a subset of content area 512 for special processing.

CRC checksum 720 for horizontal offset 716 and vertical offset 718 is preferably an 8-bit polynomial data pattern, 10011001, used to reduce the possibility of error in the offsets. Stop sequence 722 of the preferred embodiment is a 6-bit data pattern in which the data on blue waveform 618 is equal to the data on red waveform 616, i.e., logical inversion is not performed. As with start sequence 712, this distinguishes stop sequence 722 from code sequence 714, horizontal offset 716, vertical offset 718, and CRC checksum 720, enabling window decoder 416 to confirm the presence of stop sequence 722.

Figure 8:
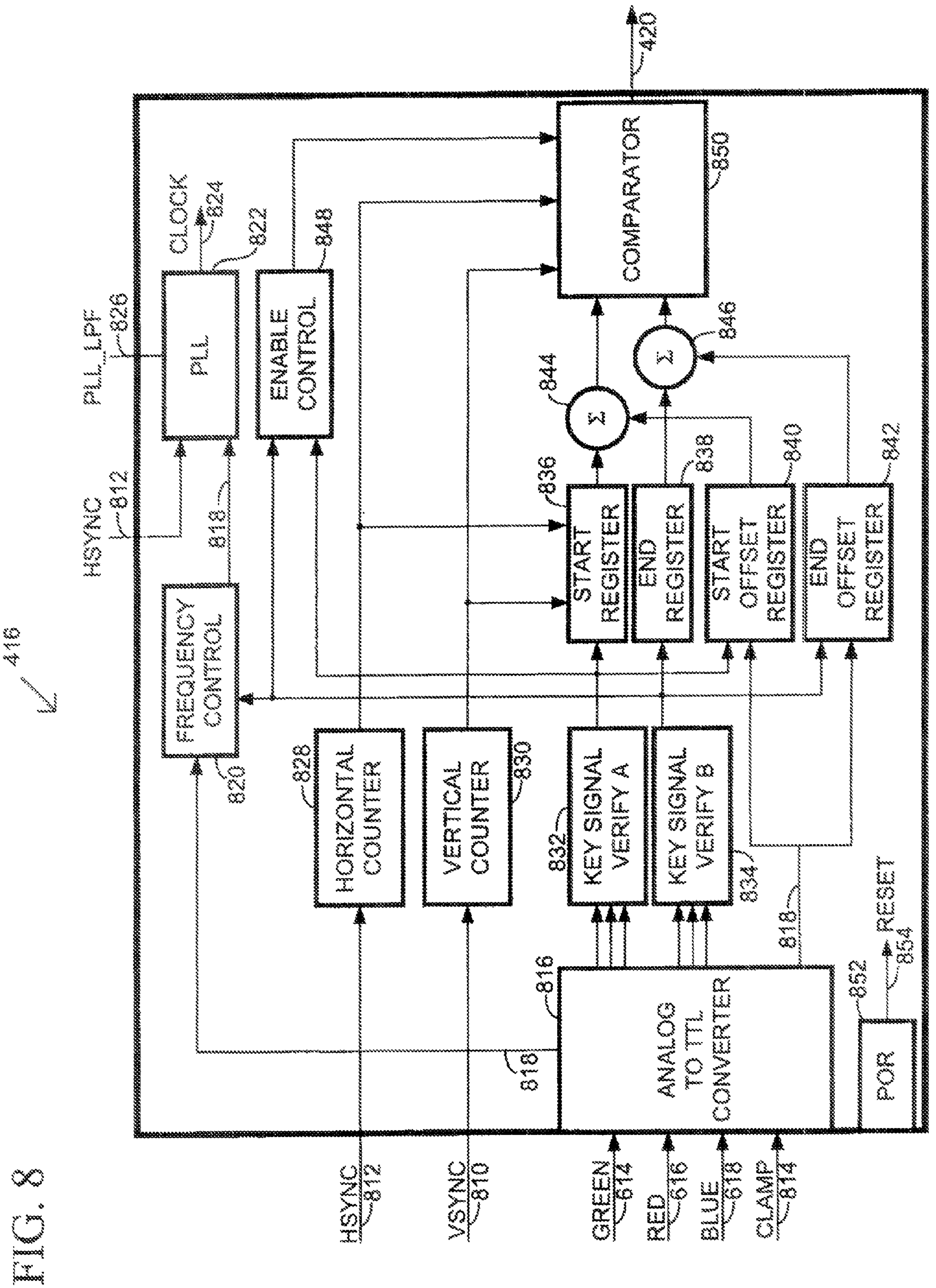
FIG. 8 is a block diagram for the preferred embodiment of the FIG. 4 window decoder, in accordance with the present invention.

Referring now to FIG. 8, a block diagram for the preferred embodiment of the FIG. 4 window decoder 416 is shown, in accordance with the present invention. In the preferred embodiment, window decoder 416 is intended to be fabricated onto a single low-cost ASIC (application-specific integrated circuit). In operation, video generator 126 (FIG. 4) creates a vertical synchronization pulse 810 to indicate the beginning of a new vertical scan of display 112 and a horizontal synchronization pulse 812 to indicate the beginning of a new scan of a horizontal line of pixels 612 on display 112. Video generator 126 also produces green waveform 614, red waveform 616, and blue waveform 618 as well as a signal from which clamp signal 814 is generated to indicate the black level of the incoming video waveforms.

Incoming waveforms 614, 616, 618, and 814 are fed into an analog-to-TTL converter 816; which produces digital signals from each color waveform based on the respective signal levels at the time the clamp signal is asserted. In the preferred embodiment, if a color waveform is at the clamp voltage level, a logical zero is assigned to the digital signal corresponding to that color waveform. If a color waveform is at 700 millivolts with respect to the clamp signal voltage level, preferably, a logical one is assigned to the digital signal corresponding to that color waveform. In the preferred embodiment, the green signal from the analog-to-TTL converter 816 is used as a video clock signal 818. Video clock signal 818 is present only when first key signal 514 or second key signal 516 are being processed. A frequency control unit 820 selectively passes video clock signal 818 to a phase-locked loop (PLL) 822 to generate a separate but synchronous internal clock signal 824. Internal clock signal 824 is necessary for clocking data into logic circuitry of window decoder 416; video clock signal 818 is not always available and thus cannot be used directly for this purpose. Internal clock signal 824 is available for use by all logic circuitry of window decoder 416, its connection to each logic circuitry element is omitted for clarity. An external low pass filter 826 is connected to the phase-locked loop (PLL) 822 which serves as an analog memory of the phase-frequency relationship between internal clock signal 824 and video clock signal 818.

The coordinates of the current pixel 612 in display 112 are tracked by window decoder 416. Each pulse of internal clock signal 824 denotes a single pixel 612 and increments horizontal counter 828. Horizontal synchronization pulse 812 indicates the beginning of a scan of a new horizontal line, and resets horizontal counter 828 and increments vertical counter 830. Vertical synchronization pulse 810 denotes the beginning of a new scan of display 112 and resets vertical counter 830. The location of any current pixel 612 can thus be determined by the contents of horizontal counter 828 and vertical counter 830.

Logic circuitry referred to as key signal verify A 832 in window decoder 416 detects and verifies the first key signal 514. Identical circuitry referred to as key signal verify B 834 in window decoder 416 detects and verifies the second key signal 516. Video clock signal 818 and TTL-level versions of red waveform 616 and blue waveform 618 are fed into the key signal verification circuits 832 and 834. Start sequence 712 triggers the key signal verification process of matching immediately following display data 710 with code sequences 714. If key signal verify A 832 successfully matches display data 710 with code sequence 714 corresponding to first key signal 514, then window decoder 416 loads the first key signal 514 coordinates from horizontal counter 828 and vertical counter 830 into start register 836. Similarly, if key signal verify B 834 successfully matches display data 710 with code sequence 714 corresponding to second key signal 516, then window decoder 416 loads the second key signal 516 coordinates from horizontal counter 828 and vertical counter 830 into end register 838.

Window decoder 416 performs additional checks to ensure the validity of key signals to prevent incorrect detection of windows 200 requiring special processing. Both key signals should be present for a number of scans of display 112 to enable special processing. The number of bits in the key signal data, that is, excluding start sequence 712 and stop sequence 722, should match the preferred number of key signal data bits. Additionally, the duration of key signals measured in terms of internal clock signal 824 periods is checked by window decoder 416. If the number of bits in the first half of a key signal does not match the number of bits in the second half of a key signal in a period of time determined by a number of internal clock signal 824 periods, the key signal is deemed invalid. The duration matching and bit counting described above helps to verify that internal clock signal 824 is properly synchronized to video clock signal 818, further preventing errors.

Key signal verify A 832 and key signal verify B 834 also extract horizontal offset 716, vertical offset 718, and CRC checksum 720 for first key signal 514 and second key signal 516, respectively. If no CRC error is found, window decoder 416 stores offset information for first key signal 514 in start offset register 840. Similarly, if no CRC error is found, window decoder 416 stores offset information for second key signal 516 in end offset register 842. Contents of start register 836 and start offset register 840 are summed by an adder 844 to compute the upper left coordinates of the portion of content area 512 to be specially processed. Similarly, the contents of end register 838 and end offset register 842 are summed by a second adder 846 to compute the lower right coordinates of the portion of content area 512 to be specially processed. When key signal verify A 832 detects and verifies first key signal 514 and key signal verify A 834 detects and verifies second key signal 516, enable control 848 sets an attribute denoting the presence of a window to be specially processed. Window decoder 416 monitors this attribute, and disables the attribute if no key signals are detected, indicating that there are no windows to be specially processed or that a special window exists but is occluded.

Comparator 850 selectively generates control signal 420 based on the values of its inputs, which are the coordinates of current pixel 612 from horizontal counter 828 and vertical counter 830, the coordinates of the portion of content area 512 to be specially processed from adders 844 and 846, and the attribute denoting the presence of a window to be specially processed from enable control 848. If the current pixel 612 is within the portion of content area 512 to be specially processed and a special window is present, then comparator 850 generates control signal 420. Power-on reset 852 produces reset signal 854 to initialize window decoder 416 when display 112 is first turned on.

Figure 9:
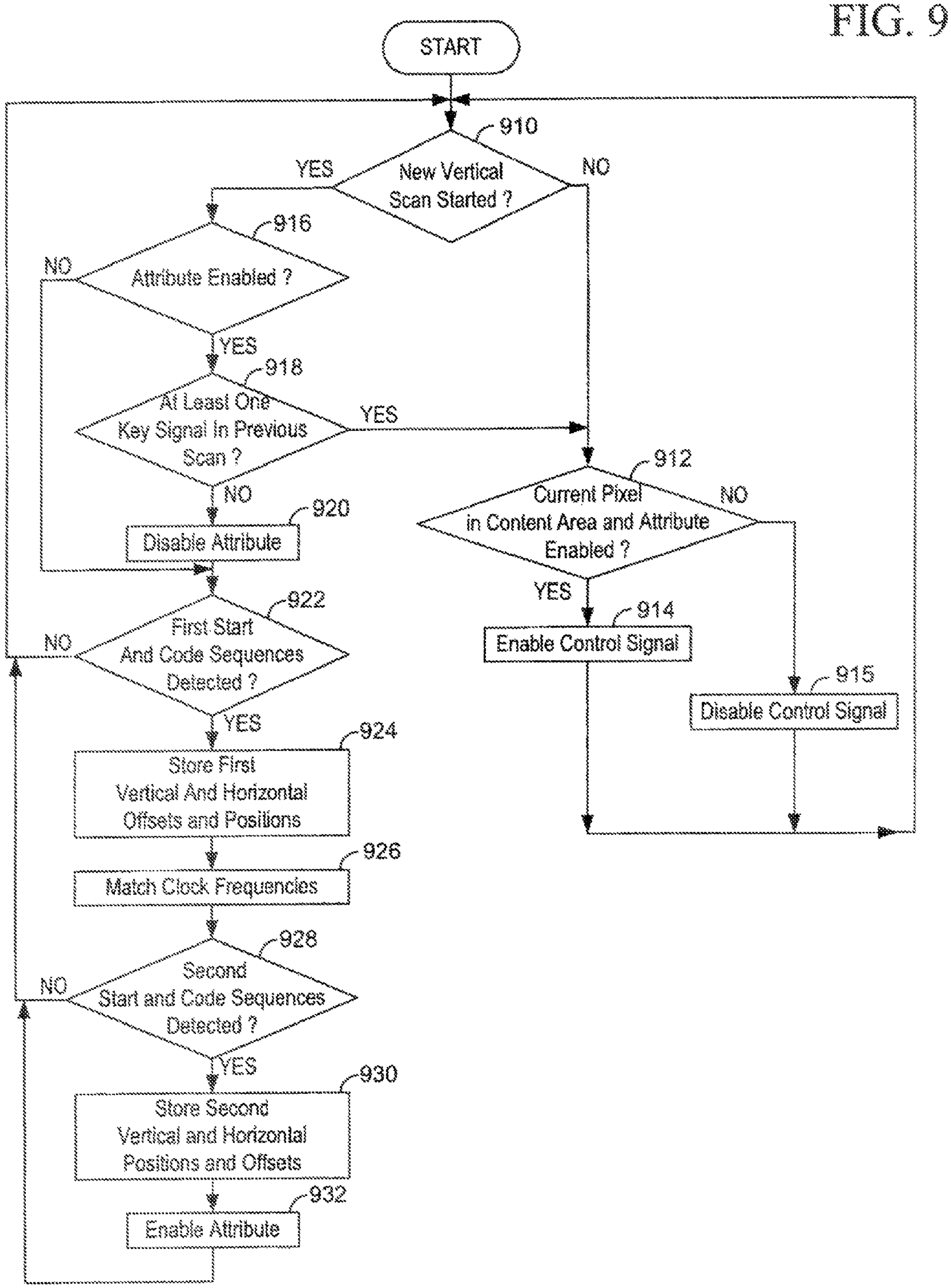
FIG. 9 is a flowchart for one embodiment of method steps to process special windows, in accordance with the present invention.

Referring now to FIG. 9, a flowchart for one embodiment of method steps to process special windows is shown, in accordance with the present invention.

Initially, in step 910, window decoder 416 determines whether a new vertical scan of display 112 has started. Window decoder 416 accomplishes this by checking for the presence of vertical synchronization pulse 810. If a new vertical scan has started, then window decoder 416 proceeds to step 916 to begin the process of identifying and locating special windows. If a new-vertical scan has not started, then window decoder 416 proceeds to step 912.

In step 912, window decoder 416 determines whether the current pixel 612 is located within the portion of content area 512 to be specially processed, and whether an attribute denoting the activation of a special window is enabled. If the current pixel 612 is located within the portion of content area 512 to be specially processed and the attribute denoting the activation of a special window is enabled, then, in step 914, window decoder 416 enables control signal 420. Control signal 420 is passed to video amplifier 414 to indicate the presence of a pixel 612 to be specially processed. For example, if control signal 420 is enabled, video amplifier 414 may responsively increase the luminance of the current pixel 612. However, if the current pixel 612 is not located within the portion of content area 512 to be specially processed or the attribute denoting the activation of a special window is not enabled, window decoder 416 disables control signal 420 in step 915. Window decoder 416 then returns to step 910 to either process the next pixel 620 in step 912 or to begin the process of identifying and locating special windows in step 916.

In step 916, window decoder 416 determines whether the attribute denoting the activation of a special window is enabled. If the attribute denoting the activation of a special window is enabled, then window decoder 416 proceeds to step 918. If the attribute denoting the activation of a special window is not enabled, then window decoder 416 proceeds to step 922 to look for first key signal 514.

In step 918, window decoder 416 determines whether at least one key signal (either first key signal 514 or second key signal 516) was detected in the previous scan of display 112. If at least one key signal was detected in the previous scan of display 112, window decoder 416 proceeds to step 912 to selectively process the current pixel 612, since at this point it is known—that a special window has been activated but it is not yet known whether the current pixel 612 is within that special window. If no key signals were detected in the previous scan of display 112, window decoder 416 proceeds to step 920 to disable the attribute denoting the activation of a special window. Disabling the attribute denoting the activation of a special window may be required because there are no special windows to be processed, or because a special window exists, but is now occluded by a standard window.

In step 922, window decoder 416 determines whether both first start sequence 712 and first code sequence 714 have been detected, signifying that first key signal 514 has been found. If both first start sequence 712 and first code sequence 714 have been detected, then window decoder 416 proceeds to step 924. If either first start sequence 712 or first code sequence 714 have not been detected, then window decoder 416 returns to step 910 to either process the next pixel 612 in step 912 or to begin the process of identifying and locating special windows in step 916.

In step 924, window decoder 416 stores information about the location of the upper left corner of the portion of content area 512 to be specially processed. Specifically, window decoder 416 stores horizontal offset 716, and vertical offset 718 from first key signal 514, and uses CRC checksum 720 to validate these values. Window decoder 416 also stores the vertical and horizontal position of current pixel 612 with respect to the upper left corner of display 112. The vertical position of current pixel 612 is computed from the count of the horizontal lines scanned since vertical synchronization pulse 810 triggered a new scan of display 112. The horizontal position of current pixel 612 is computed from the count of pixels 612 scanned since horizontal synchronization pulse 812 triggered a scan of a new horizontal line of display 112.

Then, in step 926, window decoder 416 matches the frequency of video clock signal 818 with the internal clock signal 824. This is accomplished via frequency control block 820 and phase-locked loop 822. Video clock signal 818 is known to be present because first key signal 514 has been detected in step 922 above, and one waveform of first key signal 514 (preferably green waveform 614) is used specifically for clocking purposes. The synchronization of video clock signal 818 and internal clock signal 824 guarantees that the intended width and duration of pixels 612 to be specially processed matches the actual width and duration of pixels 612 that are specially processed. The matching of pixel 612 widths prevents problems of horizontal pixel blurring that may occur in display systems using dual, versus single, communications channels.

Then, in step 928, window decoder 416 determines whether both second start sequence 712 and second code sequence 714 have been detected, signifying second key signal 516 has been found. If both second start sequence 712 and second code sequence 714 have been detected, then window decoder 416 proceeds to step 930. If either second start sequence 712 or second code sequence 714 have not been detected, then window decoder 416 returns to step 910 to either process the next pixel 612 in step 912 or to begin the process of identifying and locating special windows in step 916.

Next, in step 930, window decoder 416 stores information about the lower right corner of the portion of content area 512 to be specially processed. Specifically, window decoder 416 stores horizontal offset 716, and vertical offset 718 from second key signal 516 and uses CRC checksum 720 to validate these values. Window decoder 416 also stores the vertical and horizontal position of current pixel 612 with respect to the upper left corner of display 112. The vertical position of current pixel 612 is computed from the count of the horizontal lines scanned since vertical synchronization pulse 810 triggered a new scan of display 112. The horizontal position of current pixel 612 is computed from the count of pixels 612 scanned since horizontal synchronization pulse 812 triggered a scan of a new horizontal line of display 112.

Finally, in step 932 window decoder 416 enables the attribute denoting the activation of a special window. By this point, window decoder 416 has located both first key signal 514 and second key signal 514 to identify the presence of a non-occluded special window. Window decoder 416 has also extracted all of the information regarding the location of the special window. The window decoder 416 then returns to step 910 to either process the next pixel in step 912 or to begin the process of identifying and locating special windows in step 916.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

The invention claimed is:

1. An apparatus for handling special windows in a display, comprising:

a window manager adapted to embed special window information in a video signal, wherein the special window information comprises a sequence of bits adapted to indicate to a window decoder that a target area of the display is to be specially processed, and wherein the sequence of bits is adapted to indicate color data for one or more pixels of a second display when read by an external device; and the window decoder in electrical communication with the window manager and adapted to extract said special window information from said video signal and responsively generate a display control signal, wherein the control signal is adapted to designate special processing for pixels to be presented upon the display.

2. The apparatus of claim 1, further comprising a video interface to transmit data including said special window information to said display.

3. The apparatus of claim 2, wherein the video interface is adapted to transmit to the display a first color signal serving as a video clock signal for said special window information, a second color signal including said special window information, and a third color signal.

4. The apparatus of claim 3, wherein the special window information comprises key signals adapted to indicate offsets for a target area of a special window.

5. The apparatus of claim 4, wherein scroll bars in said special windows function as controls for special processing.

6. The apparatus of claim 4, wherein said key signals include hidden watermarks.

7. The apparatus of claim 4, wherein said key signals include visibly apparent symbols.

8. The apparatus of claim 4, further comprising:

key signal verification circuits identifying said special windows and responsively enabling an attribute;

a vertical counter monitoring a number of vertically scanned lines of said pixels occurring after a vertical synchronization signal;

a horizontal counter monitoring a number of horizontally scanned pixels after a horizontal synchronization signal;

registers storing said target area position in terms of said vertically scanned lines and said horizontally scanned pixels when said attribute is enabled;

a comparator monitoring a position of said pixels in terms of said vertically scanned lines and said horizontally scanned pixels, comparing said position of said pixels to said target area position, and responsively generating said display control signal to enable special processing.

9. The apparatus of claim 8, further comprising:

an internal logic clock signal denoting an intended duration for said special processing of said pixels in said target area; and a frequency control unit synchronizing said internal logic clock signal to said video clock signal to regulate a horizontal width of said pixels in said target area with a duration of said display control signal, thereby calibrating said special processing with a scan of said display.

10. The apparatus of claim 9, wherein said key signal verification circuits enable said attribute when a duration of said key signals in terms of internal logic clock signal periods is consistent with a key signal format.

11. The apparatus of claim 8, wherein said attribute is disabled by an absence of said key signals.

12. The apparatus of claim 8, wherein said key signal verification circuits enable said attribute when said key signals exist during one scan of said display and persist for a number of scans of said display.

13. A method for handling special windows in a display, the method for use in a display device, said method comprising the steps of:

embedding special window information in a video signal, wherein the special window information is adapted to indicate to a window decoder disposed within the display device that a target area of the display is to be specially processed, and wherein the special window information is adapted to indicate color data for one or more pixels of a second display when read by a second display device;

extracting said special window information from said video signal using the window decoder; and generating a display control signal in response to said window information to enable different processing of said special windows in said display.

14. The method of claim 13, further comprising the steps of:

specially processing a target area in said special windows in response to said display control signal; and transmitting data including said special window information to said display using a video interface.

15. The method of claim 14, further comprising the steps of:

depicting pixels in said display;

transmitting a first color signal serving as a video clock signal for said special window information;

transmitting a second color signal including said special window information; and transmitting a third color signal.

16. The method of claim 15, further comprising the step of:

transmitting key signals including a pattern of bits of said special window information to encode a target area position, and corresponding to a pattern of said pixels depicted in said display.

17. The method of claim 16, wherein scroll bars in said special windows function as controls for special processing.

18. The method of claim 16, wherein said key signals include hidden watermarks.

19. The method of claim 16, wherein said key signals include visibly apparent symbols.

20. The method of claim 16, further comprising the steps of:

identifying said special windows and responsively enabling an attribute using key signal verification circuits;

monitoring a number of vertically scanned lines of said pixels occurring after a vertical synchronization signal using a vertical counter;

monitoring a number of horizontally scanned pixels after a horizontal synchronization signal using a horizontal counter;

using registers to store said target area position in terms of said vertically scanned lines and said horizontally scanned pixels when said attribute is enabled;

using a comparator to monitor a position of said pixels in terms of said vertically scanned lines and said horizontally scanned pixels, to compare said position of said pixels to said target area position, and to responsively generate said display control signal to enable special processing.

21. The method of claim 20, wherein said key signal verification circuits enable said attribute when a duration of said key signals in terms of internal logic clock signal periods is consistent with a key signal format.

22. The method of claim 20, wherein said attribute is disabled by an absence of said key signals.

23. The method of claim 20, wherein said key signal verification circuits enable said attribute when said key signals exist during one scan of said display and persist for a number of scans of said display.

24. The method of claim 16, further comprising the steps of:

denoting an intended duration for said special processing of said pixels in said target area using an internal logic clock signal; and using a frequency control unit to synchronize said internal logic clock signal to said video clock signal and regulate a horizontal width of said pixels in said target area with a duration of said display control signal, thereby calibrating said special processing with a scan of said display.

* * * * *